United States Patent
Chiang

(10) Patent No.: US 6,629,548 B1
(45) Date of Patent: Oct. 7, 2003

(54) SAWDUST COLLECTING DEVICE FOR A WOOD PLANING MACHINE

(76) Inventor: Pei-Lieh Chiang, No. 12, Nan-Ping Rd., Nan Dist, Taichung City (TW)

( * ) Notice: Subject to any disclaimer, the term of this patent is extended or adjusted under 35 U.S.C. 154(b) by 0 days.

(21) Appl. No.: 10/284,949

(22) Filed: Oct. 31, 2002

(30) Foreign Application Priority Data

Jul. 15, 2002 (TW) ..................................... 91210748 U

(51) Int. Cl.⁷ ............................................... B27G 21/00
(52) U.S. Cl. ..................... 144/252.1; 15/312.2; 15/314; 144/114.1; 409/137
(58) Field of Search ........................ 15/35, 337, 312.2, 15/314; 144/117.1, 252.1; 409/132, 137; 83/100; 451/453, 456

(56) References Cited

U.S. PATENT DOCUMENTS

| | | | |
|---|---|---|---|
| 5,150,499 A | * | 9/1992 | Berfield ..................... 15/327.1 |
| 5,882,155 A | * | 3/1999 | Testa, Jr. .................. 144/252.1 |
| 6,289,956 B1 | * | 9/2001 | Shriver ..................... 144/252.1 |
| 6,293,321 B1 | * | 9/2001 | Chiang ..................... 144/252.1 |
| 6,382,278 B1 | * | 5/2002 | Liao et al. ................ 144/252.1 |
| 6,481,474 B1 | * | 11/2002 | Liao et al. ................ 144/252.1 |
| 6,481,475 B1 | * | 11/2002 | Liao et al. ................ 144/252.1 |

* cited by examiner

*Primary Examiner*—W. Donald Bray
(74) *Attorney, Agent, or Firm*—Trop, Pruner & Hu, P.C.

(57) ABSTRACT

A sawdust collecting device includes a flexible sleeve having a tapered top section with an open top end, and a bottom section having an open bottom end. A truncated cone-shaped coil spring is disposed in the tapered top section of the flexible sleeve, and abuts against an inner wall of the tapered top section of the flexible sleeve so as to expand the tapered top section of the flexible sleeve. A sawdust collector is disposed below the flexible sleeve, and has an open top end connected to the open bottom end of the flexible sleeve.

4 Claims, 11 Drawing Sheets

SAWDUST COLLECTING DEVICE FOR A WOOD PLANING MACHINE

CROSS REFERENCE TO RELATED APPLICATION

This application claims priority of Taiwan Application No. 091210748, filed on Jul. 15, 2002.

BACKGROUND OF THE INVENTION

1. Field of the Invention

The present invention relates to a sawdust collecting device, more particularly to a sawdust collecting device for a wood planing machine.

2. Description of the Related Art

Referring to FIGS. 1 and 2, a conventional sawdust collecting device for a wood planing machine 2 is shown to include a sawdust collecting bag 11, and a C-shaped fastener clip 12. The sawdust collecting bag 11 has a constricted open top end 110 sleeved around a sawdust discharging outlet 21 of the wood planing machine 2. The C-shaped fastener clip 12 is sleeved around the top end 110 of the sawdust collecting bag 11, and is tightened by means of a screw 13 and a nut 14 so as to prevent removal of the sawdust collecting bag 11 from the sawdust discharging outlet 21.

The aforementioned conventional sawdust collecting device is disadvantageous in that it is inconvenient to tighten or loosen the fastener clip 12 around the open top end 110 of the sawdust collecting bag 11. Moreover, it is fairly difficult to discard the sawdust from the sawdust collecting bag 11 since the open top end 110 is relatively small.

SUMMARY OF THE INVENTION

Therefore, the object of this invention is to provide a sawdust collecting device for a wood planing machine so as to eliminate the aforesaid disadvantage.

Accordingly, a sawdust collecting device of the present invention is adapted to be mounted on the sawdust-discharging outlet of a wood planing machine, and includes a flexible sleeve, a truncated coneshaped coil spring, and a sawdust collector. The flexible sleeve includes a tapered top section having an open top end and an inner wall, and a bottom section having an open bottom end that is opposite to the open top end and that has a cross-section greater than that of the open top end. The open top end is tapered in a direction away from the open bottom end. The coil spring is disposed in the tapered top section of the flexible sleeve, and abuts against the inner wall of the tapered top section of the flexible sleeve so as to expand the tapered top section. The coil spring is adapted to be sleeved on the sawdust-discharging outlet of the wood planing machine. The sawdust collector has an open top end connected removably to the open bottom end of the flexible sleeve.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENTS

Figure 1:
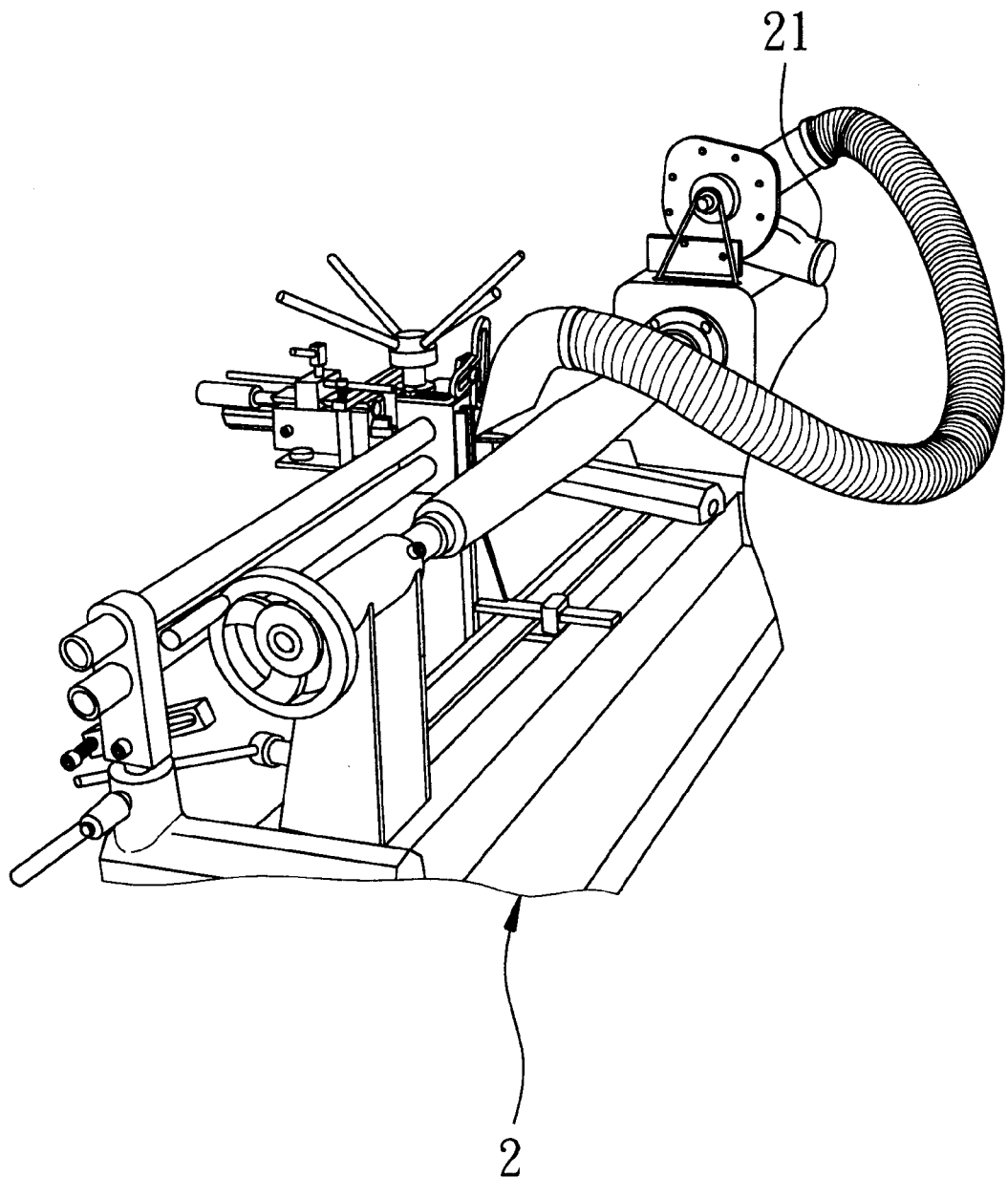
FIG. 1 is a perspective view of a wood planing machine with a conventional sawdust collecting device.
Figure 2:
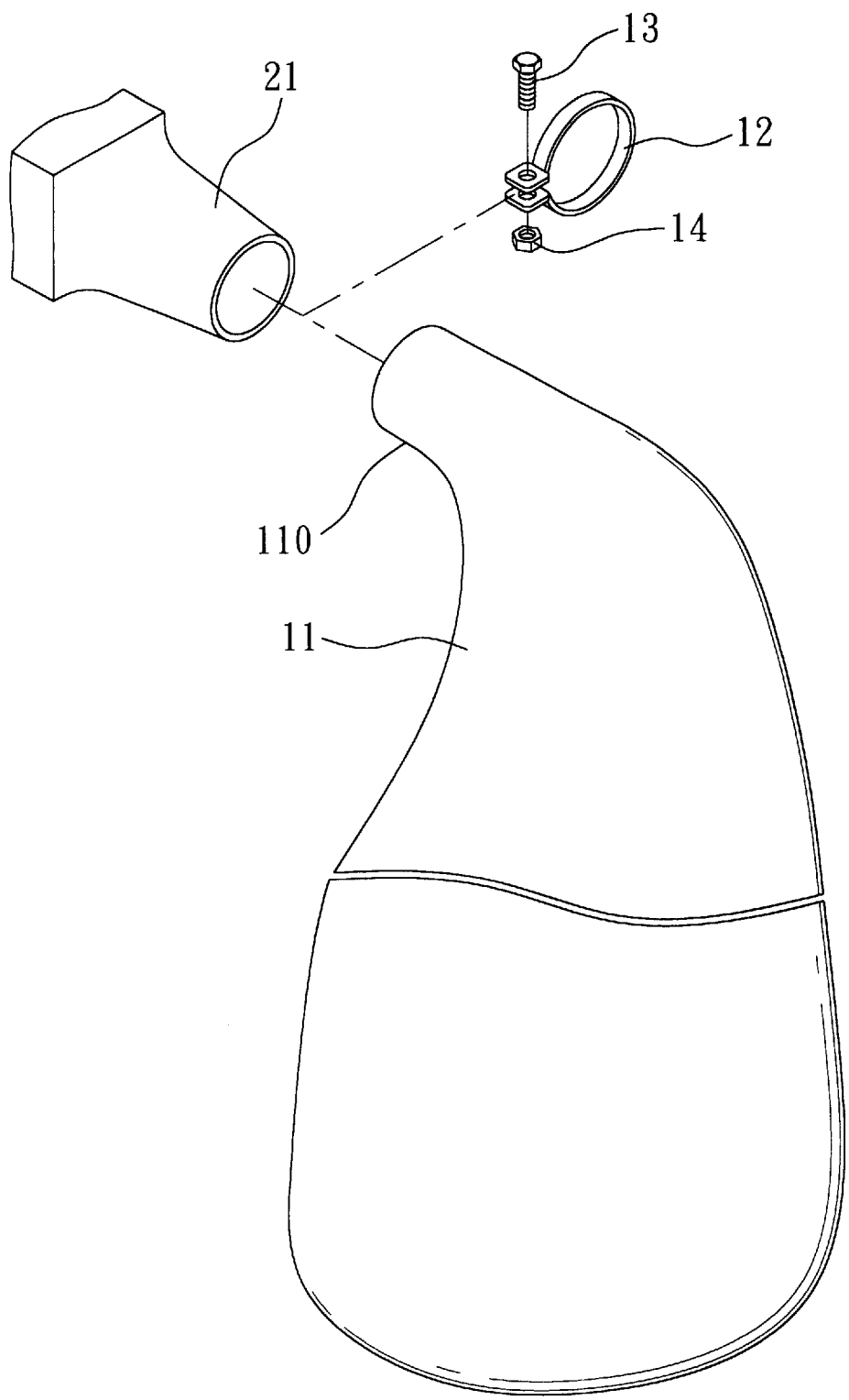
FIG. 2 is an enlarged perspective view of the sawdust collecting device shown in FIG. 1.
Figure 3:
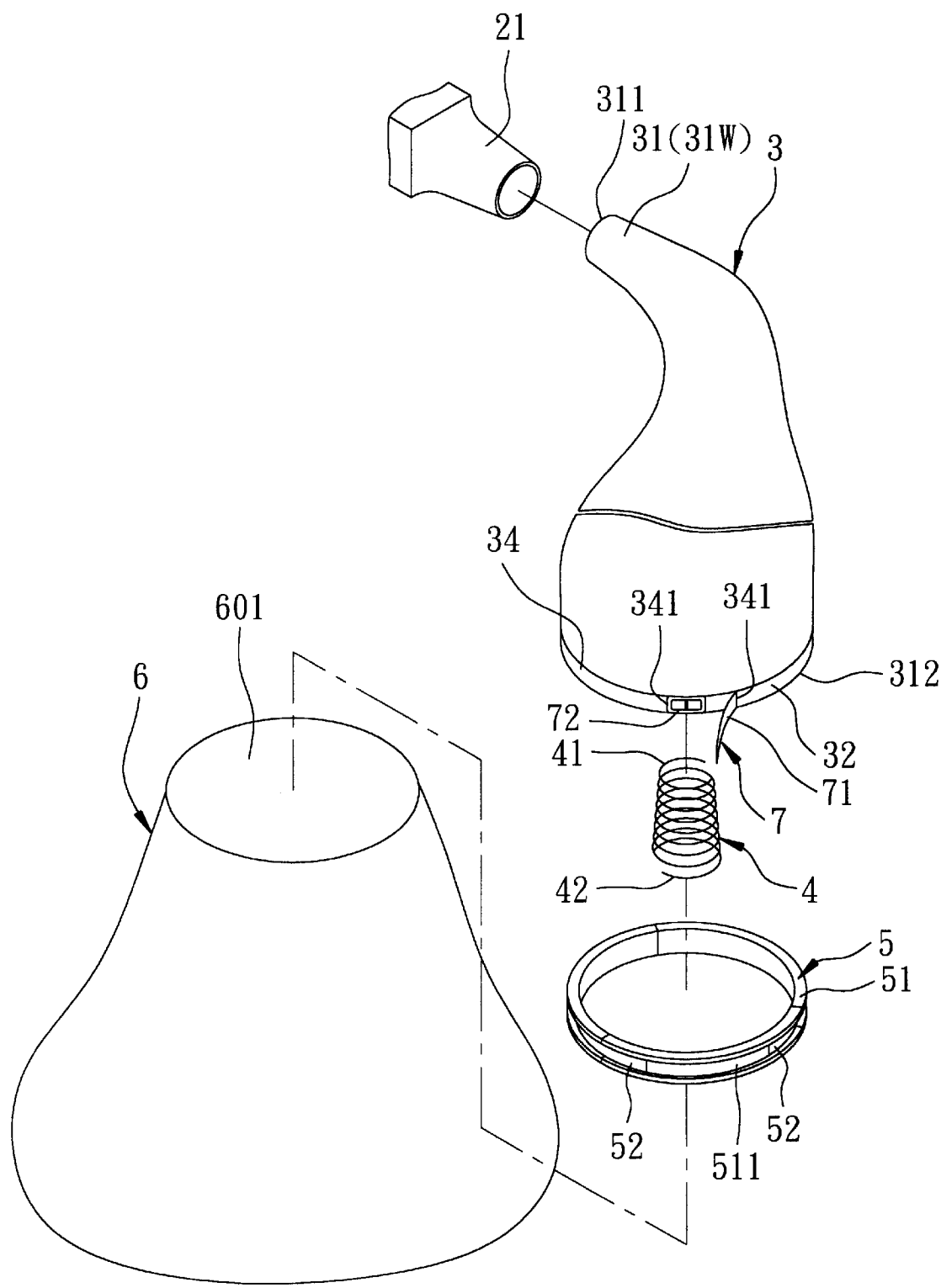
FIG. 3 is an exploded view of a preferred embodiment of a sawdust collecting device according to the present invention for use in a wood planing machine.
Figure 4:
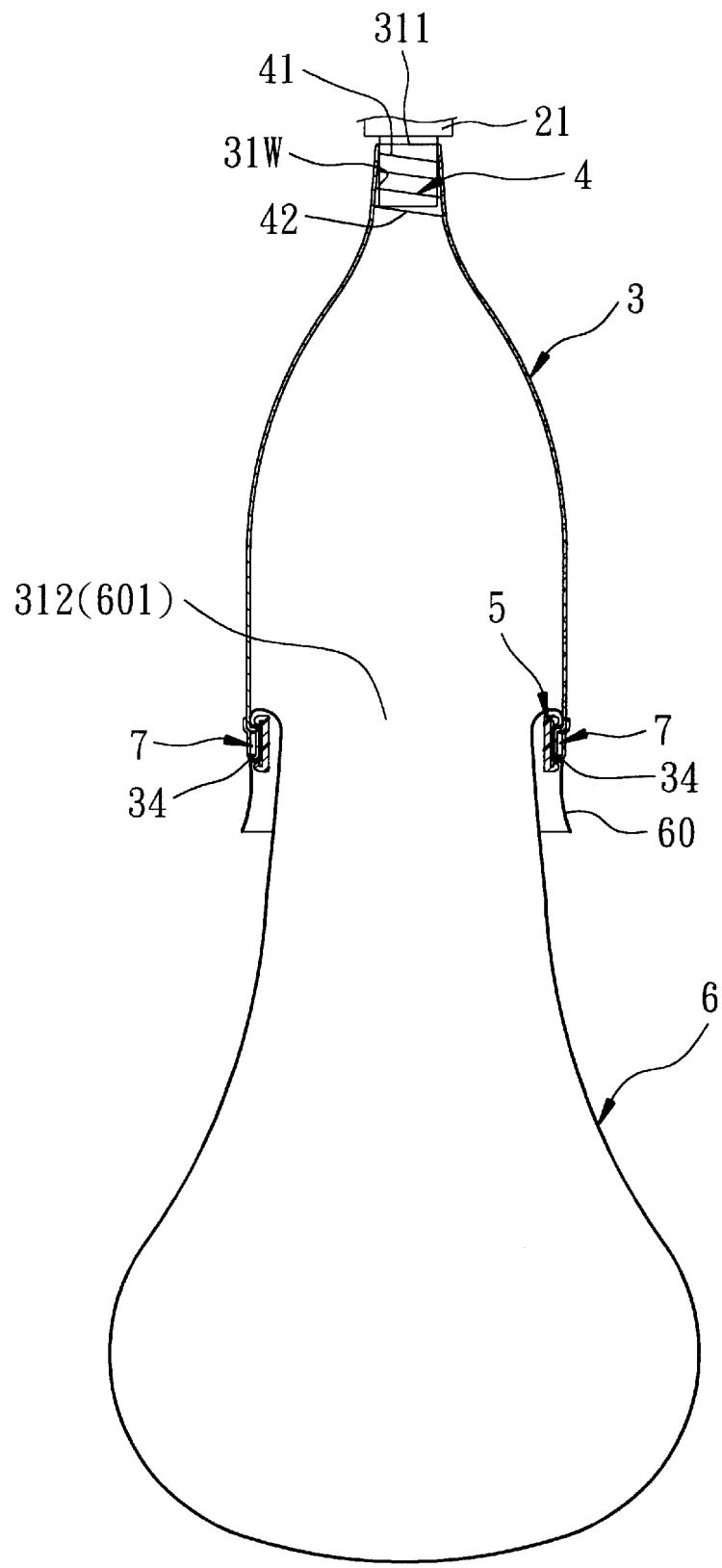
FIG. 4 is a sectional view of the preferred embodiment.
Figure 5:
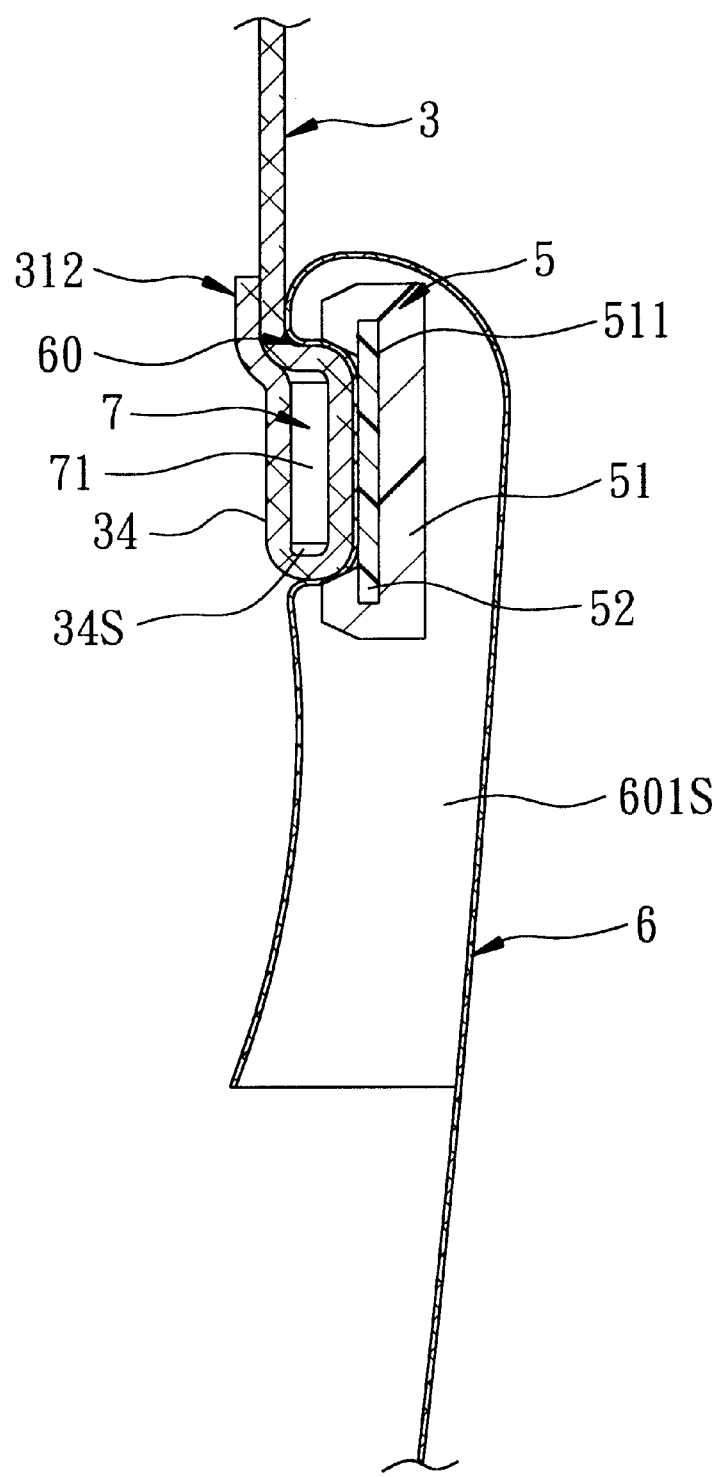
FIG. 5 is a partly sectional view of the preferred embodiment shown in FIG. 4.

Referring to FIGS. 3 to 5, the preferred embodiment of a sawdust collecting device according to the present invention is adapted to be connected to a sawdust discharging outlet 21 of a wood planing machine (not shown), and includes a flexible sleeve 3, a truncated cone-shaped coil spring 4, an annular mounting member 5, and a sawdust collector 6.

As illustrated, the flexible sleeve 3 includes a tapered top section 31 having an open top end 311 and an inner wall 31W (see FIG. 4), and a bottom section 32 having an open bottom end 312 that is opposite to the open top end 311 and that has a cross-section greater than that of the open top end 311 such that the open top end 311 is tapered in a direction away from the open bottom end 312.

Figure 6:
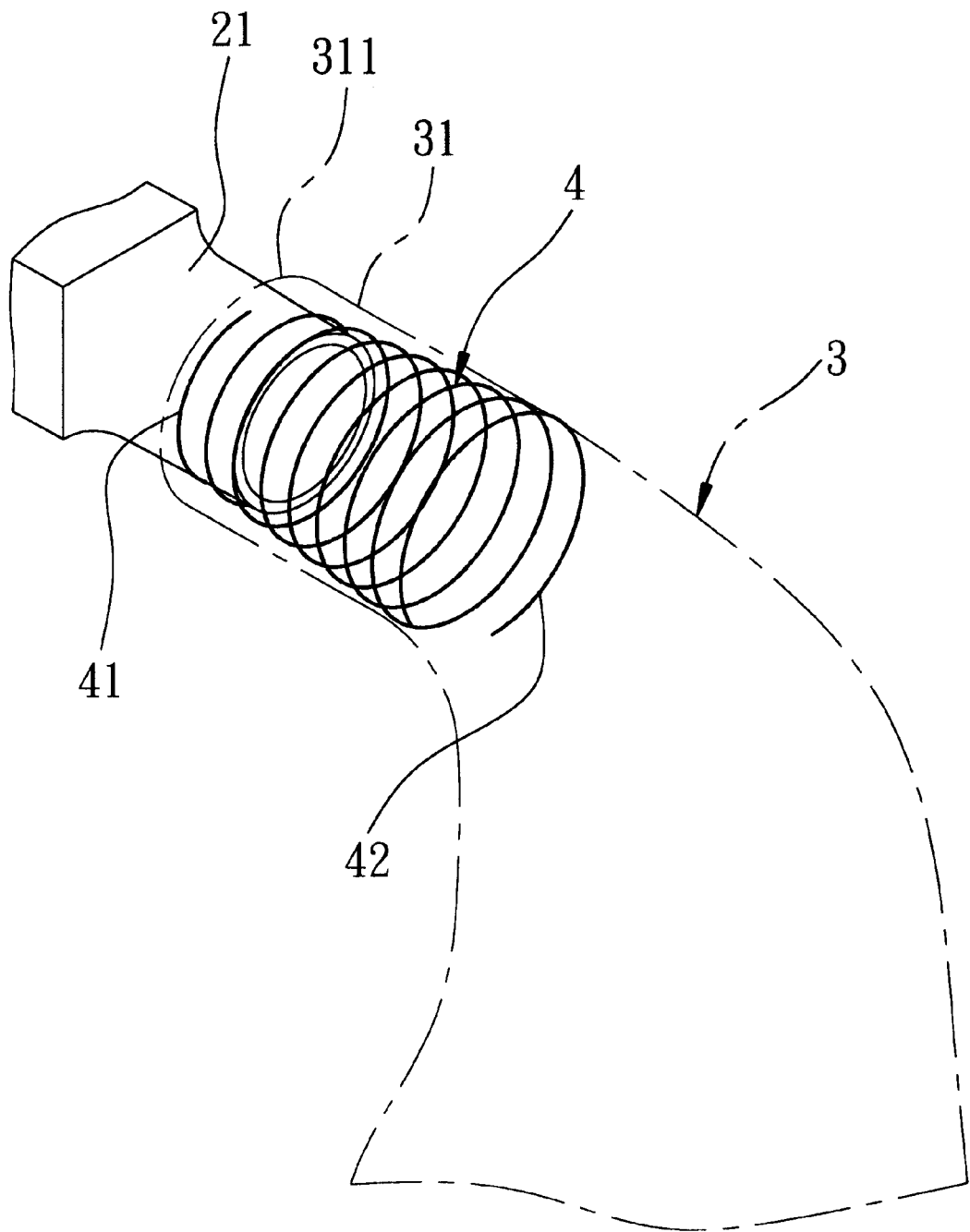
FIG. 6 illustrates how the preferred embodiment is connected to a sawdust-discharging outlet of the wood planing machine.

The coil spring 4 is disposed in the tapered top section 31 of the flexible sleeve 3, and abuts against the inner wall 31W of the tapered top section 31 of the flexible sleeve 3 so as to expand the tapered top section 31 and so as to prevent disengagement of the coil spring 4 from the flexible sleeve 3. The coil spring 4 is adapted to be sleeved on the sawdust-discharging outlet 21 of the wood planing machine, as best shown in FIGS. 4 and 6 so as to permit passage of sawdust discharged from the discharging outlet 21 through the flexible sleeve 3. As how the sawdust from the wood planing machine is discharged through the flexible sleeve 3 via the sawdust discharging outlet 21 is not essential to the present invention, a detailed description of the same is omitted herein for the sake of brevity.

The sawdust collector 6, which is preferably made from flexible plastics, has an open top end 601 connected removably to the open bottom end 312 of the flexible sleeve 3. The open top end 601 has a cross-section greater than that of the open top end 311 of the flexible sleeve 3.

Preferably, the open bottom end 312 of the flexible sleeve 3 is formed with a cuff 34 and a belt-receiving space 34S (see FIG. 5) confined by the cuff 34. The cuff 34 is formed with two opposing cuff openings 341 that are in spatial communication with the belt-receiving space 34S. The preferred embodiment further includes a fastener belt 7 that is disposed in the belt-receiving space 34S and that has two distal ends 71, 72 respectively extending out of the cuff openings 341. The distal ends 71, 72 can be connected or disconnected to permit tightening and loosening of the open bottom end 312 of the flexible sleeve 3 around the open top end 601 of the sawdust collector 6.

Figure 7:
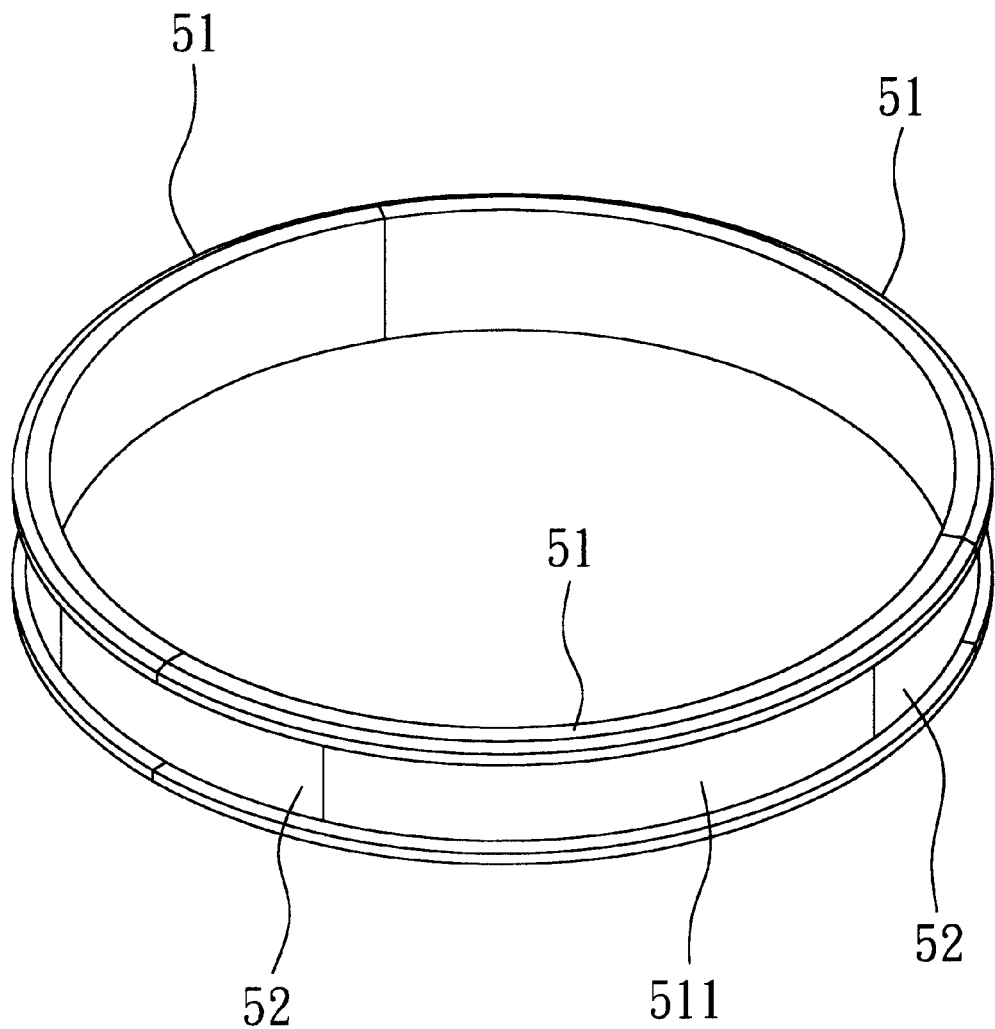
FIG. 7 is a perspective view of an annular mounting member of the preferred embodiment.
Figure 8:
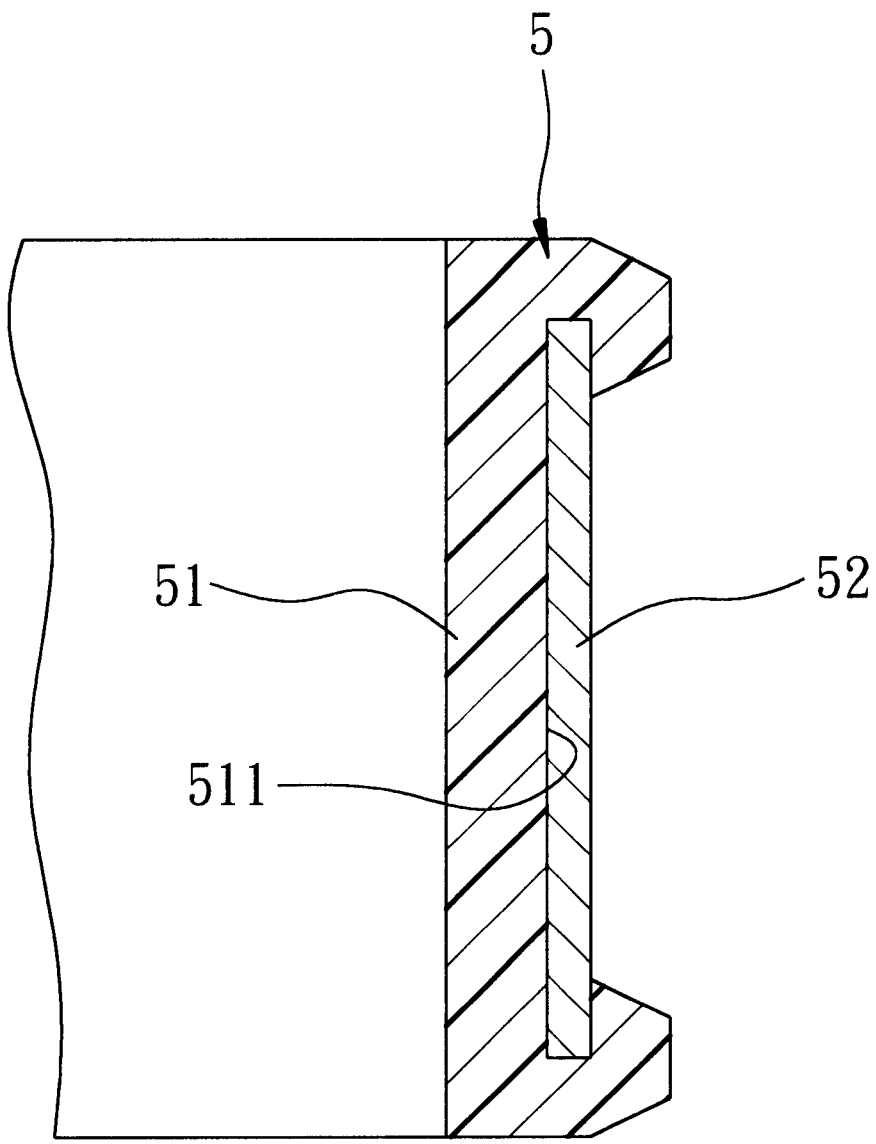
FIG. 8 is a sectional view of the mounting member shown in FIG. 7.
Figure 9:
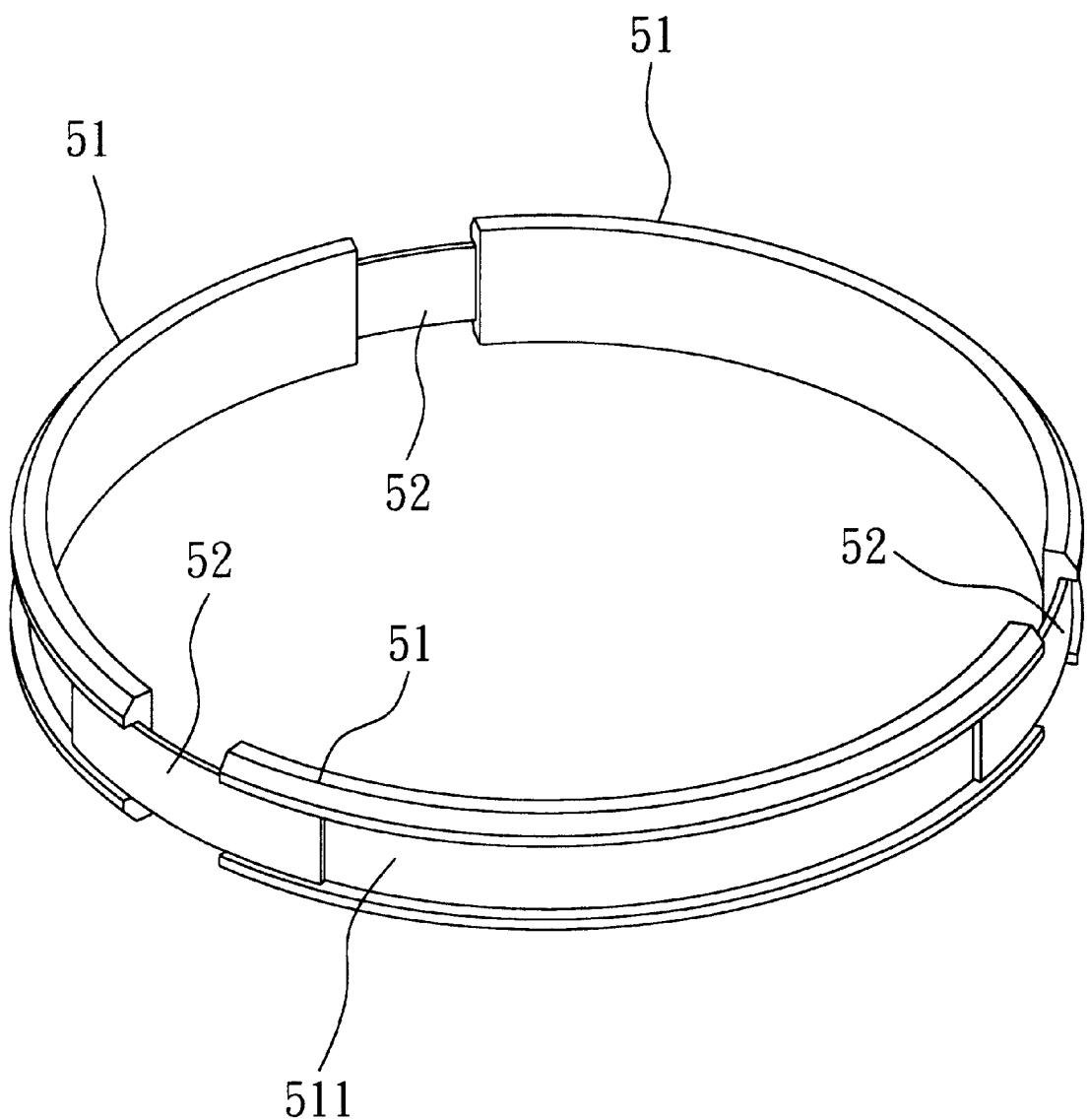
FIG. 9 is a perspective view of the mounting member employed in the preferred embodiment in an expanded state.

Preferably, the open top end 601 of the sawdust collector 6 is turned outwardly and downwardly to form a turnback portion 60 and a receiving space 601S confined by the turnback portion 60 (see FIG. 5). The mounting member 5 is disposed in the receiving space 601S, and includes a plurality of arcuate rails 51, each of which defines an arcuate groove 511, and a plurality of arcuate sliding plates 52, each of which has two opposite ends that are slidably and respectively received in the arcuate grooves 511 of an adjacent pair of the arcuate rails 51 so as to permit expansion and contraction of diameter of the annular mounting member 5, as best shown in FIGS. 7, 8 and 9. The arcuate grooves 511 of the arcuate rails 51 cooperatively define an annular groove.

When the sawdust collecting device of the present invention is in use, the coil spring 4 is sleeved on the discharging outlet 21 of the wood planing machine, and the sawdust collector 6 is disposed below the flexible sleeve 3. A part of the turnback portion 60 of the sawdust collector 6 is disposed within the annular groove of the mounting member 5. Then, the cuff 34 of the flexible sleeve 3 is sleeved around the part of the turnback portion 60 so as to press the part of the turnback portion 60 against the mounting member 5 upon tightening of the fastener belt 7 around the part of the turnback portion 60, thereby interconnecting the sawdust collector 6 and the flexible sleeve 3, as best shown in FIG. 5.

Due to the arrangement of the fastener belt 7 and the annular mounting member 5, the sawdust collector 6 can be easily connected to or removed from the flexible sleeve 3. In addition, since the dimension of the open top end 601 is relatively large, discarding the sawdust from the sawdust collector 6 is convenient, as compared with the prior art sawdust collecting bag.

Figure 10:
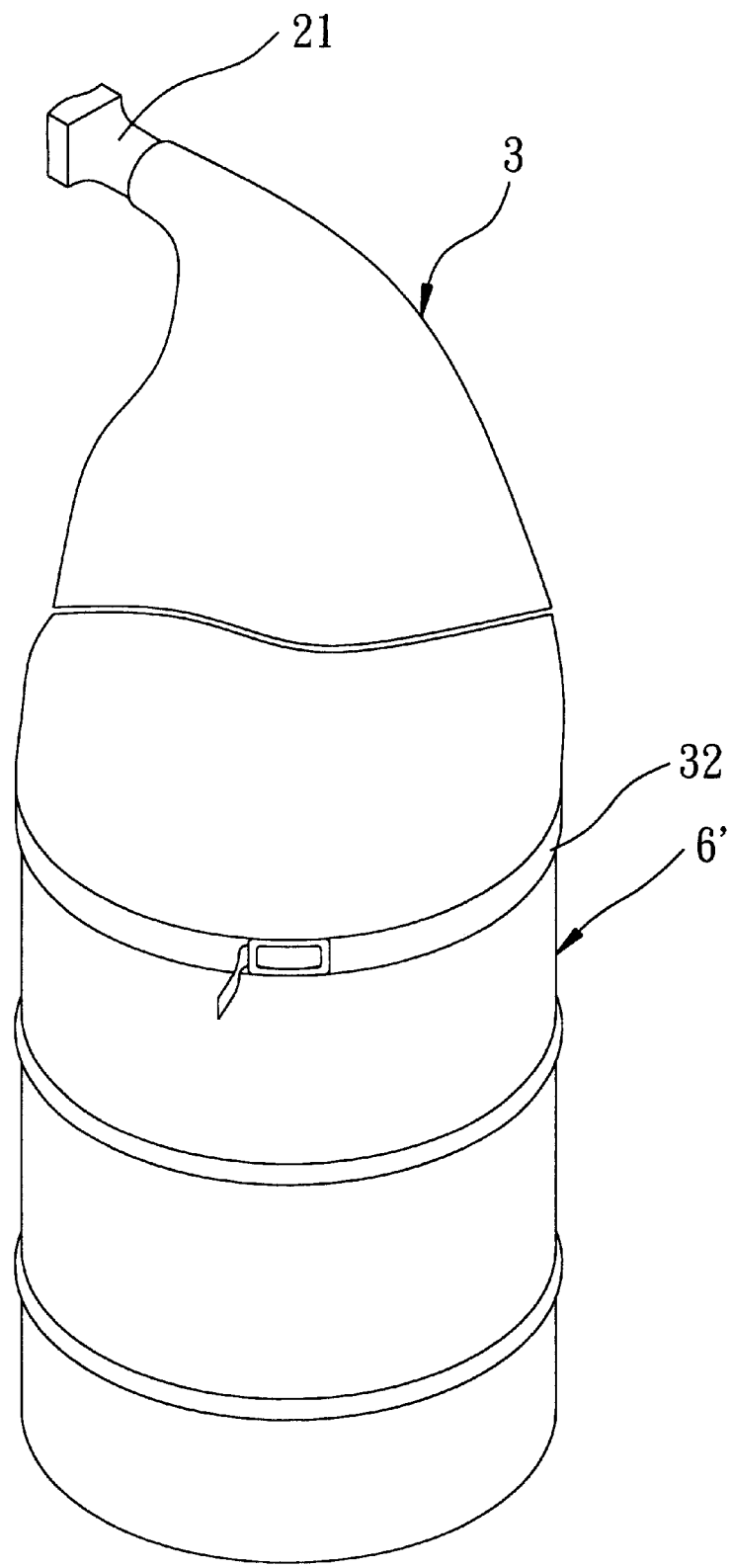
FIGS. 10 and 11 respectively show a modified preferred embodiment of a sawdust collecting device according to the present invention.
Figure 11:
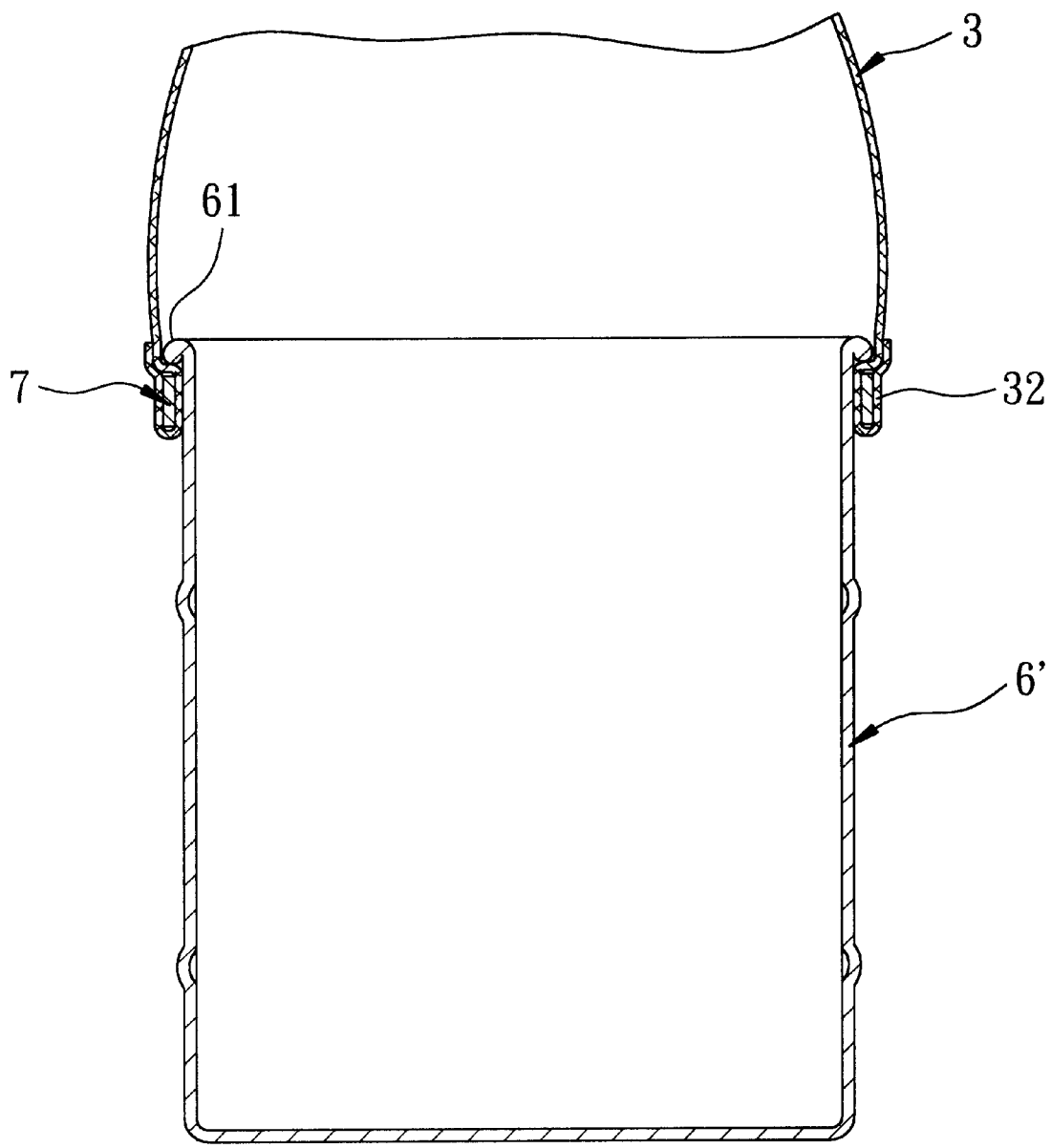

Referring to FIGS. 10 and 11, a modified preferred embodiment of the sawdust collecting device of the present invention is shown to be similar to the previous embodiment in construction. The main difference resides in that the sawdust collector 6' is made from a substantially rigid material so that the open bottom end 32 of the flexible sleeve 3 can be directly tied around the open top end 61 of the sawdust collector 6' by means of the fastener belt 7, thereby eliminating the need for a mounting member 5.

With this invention thus explained, it is apparent that numerous modifications and variations can be made without departing from the scope and spirit of this invention. It is therefore intended that the invention be limited only as indicated in the appended claims.

I claim:

1. A sawdust collecting device for a wood planing machine with a sawdust-discharging outlet, said device comprising:

a flexible sleeve including a tapered top section having an open top end 311 and an inner wall, and a bottom section having an open bottom end that is opposite to said open top end and that has a cross-section greater than that of said open top end, said open top end being tapered in a direction away from said open bottom end;

a truncated cone-shaped coil spring disposed in said tapered top section of said flexible sleeve, and abutting against said inner wall of said tapered top section of said flexible sleeve so as to expand said tapered top section, said coil spring being adapted to be sleeved on the sawdust-discharging outlet of the wood planing machine; and a sawdust collector having an open top end connected removably to said open bottom end of said flexible sleeve.

2. The sawdust collecting device as defined in claim 1, wherein said open bottom end of said flexible sleeve is formed with a cuff and a belt-receiving space confined by said cuff, said cuff being formed with two opposing cuff openings in spatial communication with said belt-receiving space, said sawdust collecting device further comprising a fastener belt disposed in said belt-receiving space and having two distal ends respectively extending out of said cuff openings so as to permit tightening and loosening of said open bottom end of said flexible sleeve around said open top end of said sawdust collector by means of said fastener belt.

3. The sawdust collecting device as defined in claim 2, further comprising an annular mounting member that includes a plurality of arcuate rails, each of which defines an arcuate groove, and a plurality of arcuate sliding plates, each of which has two opposite ends that are slidably and respectively received in said arcuate grooves of an adjacent pair of said arcuate rails so as to permit expansion and contraction of diameter of said mounting member, said arcuate grooves of said arcuate rails cooperatively defining an annular groove, said open top end of said sawdust collector being foldable to form a turnback portion which confines a space to receive said mounting member therein and which has a part received in said annular groove of said mounting member, said cuff of said flexible sleeve being sleeved around said part of said turnback portion of said sawdust collector so as to press said part of said turnback portion against said mounting member upon tightening of said fastener belt around said part of said turnback portion, thereby interconnecting firmly said sawdust collector and said flexible sleeve.

4. A sawdust collecting device for a wood planing machine with a sawdust-discharging outlet, said device comprising:

a flexible sleeve including a tapered top section having an open top end and an inner wall, and a bottom section having an open bottom end that is opposite to said open top end and that has a cross-section greater than that of said open top end, said open top end of said flexible sleeve being tapered in a direction away from said open bottom end and adapted to be connected to the sawdust-discharging outlet of the wood planing machine, said open bottom end of said flexible sleeve being formed with a cuff and a belt-receiving space confined by said cuff, said cuff being formed with two cuff openings in spatial communication with said belt-receiving space;

a fastener belt disposed in said belt-receiving space, and having two distal ends respectively extending out of said cuff openings so as to permit tightening and loosening of said fastener belt;

a sawdust collector disposed below said flexible sleeve, and having an open top end; and an annular mounting member including a plurality of arcuate rails, each of which defines an arcuate groove, and a plurality of arcuate sliding plates, each of which has two opposite ends that are slidably and respectively received in said arcuate grooves of an adjacent pair of said arcuate rails so as to permit expansion and contraction of the diameter of said mounting member, said arcuate grooves of said arcuate rails cooperatively defining an annular groove, said open top end of said sawdust collector being foldable to form a turnback portion 60 which confines a space to receive said mounting member therein and which has a part received in said annular groove of said mounting member, said cuff of said flexible sleeve being sleeved around said part of said turnback portion so as to press said part of said turnback portion against said mounting member upon tightening of said fastener belt around said part of said turnback portion, thereby interconnecting firmly said sawdust collector and said flexible sleeve.

* * * * *